UNITED STATES PATENT OFFICE.

EMIL WEINHEIM, OF NEW YORK, N. Y.

PROCESS OF FORMING LEATHER SUBSTITUTES.

1,263,171. Specification of Letters Patent. Patented Apr. 16, 1918.

No Drawing. Application filed November 14, 1917. Serial No. 201,989.

*To all whom it may concern:*

Be it known that I, EMIL WEINHEIM, a citizen of the United States, and a resident of the city, county, and State of New York, have invented certain new and useful Improvements in Processes of Forming Leather Substitutes, set forth in the following specification.

This invention relates to the converting of a textile fabric into substitute leather, and more particularly to the method of preparing the leatherfying dope to be employed, and has particular reference to the condition of this leatherfying dope at the time of its application to the textile fabric.

Leatherfying dope, as employed in this art, varies somewhat in its ingredients, but usually has consisted of a solution of certain substances such as cellulose, nitro-cellulose, and their derivatives, and partially oxidized oils in volatile solvents such as alcohol, and derivatives of wood oil and coal, into which solution has been mixed suitable pulverulent coloring matter and fillers, so that the resultant dope is partially a solution, partially an emulsion and partially a mixture, but which has always acquired a large amount of its fluidity through the means of its incorporated volatile solvent. It has been the practice to apply this dope to a moving strip of textile fabric through the medium of suitable machinery, as for example such as that set forth in my copending application, Serial No. 130,930, filed Nov. 11, 1916, for a method of completely impregnating textile fabric with filling material. After certain manipulation to work the dope into the fabric, the fabric has been run through heated curing or drying rooms for the purpose of driving out the volatile solvent and moisture, if the latter be present. As heretofore practised, it has been customary to make a number, even as many as ten, applications of the leatherfying dope to the fabric with an intermediate passage through the curing room prior to each successive application. Notwithstanding the relatively thin layer of applied dope by this repeated application process, it has been difficult to prevent pin-holes in the coating due to the escape of the volatile solvent in the curing room. Pin-holes greatly injure the value of the finished product. This old process has also been costly, due to the loss of the volatile solvent in the curing room, so that attempts have heretofore been made to reclaim the volatile solvent from the heated curing air, but the expense of the reclaiming has about approximated the value of the product reclaimed. Furthermore there has been great danger due to explosions when the volatile solvent has been, of necessity, mixed in large quantities with the heated curing air. This disadvantage has of course been independent of the expense attendant upon the loss of the volatile solvent.

More specifically it is an object of my invention to overcome all of the disadvantages and defects in the processes outlined above. For example, it is an object of my invention to reclaim all the volatile solvent employed in making the dope in a cheap, safe and convenient manner. It is a further object of the invention to reduce the number of necessary coatings applied to a textile fabric in changing it into substitute leather. I contemplate the production of a high-grade substitute leather by means of a single application of leatherfying dope and also the total elimination of pin-holes. It is a further object of my invention to cheapen and make more safe the curing of substitute leather and more particularly to make possible the employment in the curing or drying room of unheated, clear, conditioned air to effect the complete curing of the finished product. By "conditioned air" I mean air which has been freed from moisture.

The above and further objects, features and details of my invention will better be understood by reference to the following detailed specification to which, as illustrative embodiments, the accompanying claims are directed.

In practising my invention I lay no claim to the discovery of any new materials to be employed to produce a suitable leatherfying dope, but contemplate the employment of any and all materials as heretofore employed in the art, and as, for example, set forth in my copending application referred to above and as set forth in the Patents Nos. 601,325, 719,787, 885,219, 1,020,499, 1,048,912. In employing cellulose derivatives such as gun-cotton, pyroxylin, tri-acetyl cellulose, and so forth, in this art, the cellulose derivative in question is procured and is initially employed in making the dope in a water-moist state, the water reducing its explosive quality. According to my invention, I make up in a suitable mixing vat a combination mixture, solution and emulsion of the desired ingredients, exactly as has heretofore been done or in any way that may be desired to be done, provided a volatile solvent is employed as one of the initial ingredients. Volatile solvents such as the alcohol, having a great affinity for water, absorb the moisture from the cellulose derivative and render it intimately mixable with the remaining ingredients to form a satisfactory dope. When this stage in my process has been reached, which is the same as the process heretofore practised, I depart radically from the old methods. While slowly mixing a dope containing a volatile solvent in a mixing vat, I inclose the vat in steam coils, maintaining the motion of the paddles or other mixing mechanism and cause the dope to be heated to a temperature of about 120° Fahrenheit. During this mixing and heating I inclose the vat with a hood connected by a suitable duct with exhaust mechanism, drawing the volatile matter from the vat together with all water moisture to suitable condensing apparatus, where it is immediately reclaimed. I prefer to practise this part of the process in an isolated plant of the type characteristically employed in connection with manufactures subject to explosion danger. In this way the entire remainder of the plant for making my substitute leather may be rendered as safe as a textile mill. Care should be taken, as recited above, that the steam coils should not be caused to heat the dope until all of the elements have been mixed cold and a complete mixture or emulsion has been produced. I have then found it safe, contrary to the belief heretofore prevalent in the industry, to raise the temperature sufficiently to drive out all the moisture and the volatile solvent.

After all the volatile solvent and moisture has been driven from the dope, I remove the resultant dope into a heatable resting tank provided with slow moving mixing paddles and keep it therein under a heat of between 120° and 140° Fahrenheit under the action of the slow moving paddles for approximately twenty-four hours.

After this twenty-four hour treatment, the resultant dope, although it has lost its volatile solvent, is extremely homogeneous and is sufficiently fluid for application to a moving textile fabric on account of the temperature at which it is maintained. It may then be applied directly to a moving textile fabric by apparatus such as that described in my aforementioned co-pending application. However, I regulate the quantity applied to the textile fabric and the doctor blades so that a sufficient amount is applied to complete the desired impregnation and coating with one application. This is possible because there is no moisture and no volatile solvent which must be expelled, and the expulsion of which will cause pin-holes. After manipulation in suitable apparatus, as for example that described in my co-pending application aforementioned, I accomplish the final curing of the substitute leather by passing through a curing room, preferably supplied with jets directed against the fabric of cleaned, dried air at atmospheric temperature. There is no necessity of inclosing the fabric in an inclosure, as is necessary in heated curing rooms. Furthermore, there is no necessity to protect against explosions because there is no volatile solvent to cause an explosion.

What is claimed and desired to be secured by United States Letters Patent is:—

1. The process of forming substitute leather comprising, dissolving a filler-base in a volatile solvent; admixing an oil; subjecting the mixture to heat in an inclosure; conveying away from said mixture the volatilized solvent; maintaining the fluidity of the resultant dope by the continued application of heat; and applying said fluid dope free from volatile solvent directly to a body fabric.

2. The process of forming substitute leather comprising, dissolving a filler-base in a volatile solvent; mixing other dope ingredients in the resultant solution; driving out substantially all the said volatile solvent; maintaining fluidity by heating; and applying the resultant dope free from volatile solvent directly to a body fabric.

In testimony whereof I have signed my name to this specification, this 12th day of November, 1917.

EMIL WEINHEIM.